United States Patent [19]

Szymanski et al.

[11] 3,865,603

[45] Feb. 11, 1975

[54] MODIFIED STARCH-EXTENDED GELATIN COMPOSITIONS

[75] Inventors: Chester D. Szymanski, Martinsville; Gerald J. Helmstetter, Somerville, both of N.J.

[73] Assignee: National Starch and Chemical Corporation, New York, N.Y.

[22] Filed: July 17, 1972

[21] Appl. No.: 272,395

[52] U.S. Cl.................. 106/130, 206/84, 220/1 R, 424/37
[51] Int. Cl...... A61k 9/04, C08b 25/02, C08h 7/00
[58] Field of Search ........... 106/130, 126; 424/359, 424/360, 361, 35, 37; 206/437, 525, 526, 527, 84; 220/1 R

[56] References Cited
UNITED STATES PATENTS

| | | | |
|---|---|---|---|
| 3,058,827 | 10/1962 | Graham | 106/130 |
| 3,329,509 | 7/1967 | Julius | 106/130 |
| 3,499,962 | 3/1970 | Wurzburg et al. | 424/35 |
| 3,765,917 | 10/1973 | Hijiya et al. | 106/126 |

*Primary Examiner*—Allan Lieberman
*Attorney, Agent, or Firm*—Thomas B. Graham

[57] ABSTRACT

Extended gelatin film-forming compositions are disclosed comprising 40 to 97 percent, by weight, of gelatin and 3 to 60 percent, by weight, of certain starch derivatives chosen from among chemically modified fluidity starches and chemically modified, thermally converted starches by means of a compatibility test. The extended gelatin products are useful in films, capsules and protective coatings.

4 Claims, No Drawings

MODIFIED STARCH-EXTENDED GELATIN COMPOSITIONS

BACKGROUND OF THE INVENTION

This invention relates to extended gelatin compositions useful as film forming materials. More particularly it relates to extended gelatin compositions containing certain chemically modified fluidity starches and chemically modified thermally converted starches.

In the term "gelatin" we include any proteinaceous material derived by hydrolytic extraction of collagen obtained from the bones, skins, and connective tissues of animals. Such materials may be obtained by hydrolytic extraction in an alkaline (lime) or acidic medium and thereafter treated for use in a particular industry. For example, the gelatin may be produced by accurately controlling the depolymerization of the protein collagen and then chemically refined, e.g., by ion exchange to meet the specifications appropriate for the particular industry.

In the manufacture of pharmaceutical capsules and coatings the gelatin films must possess certain desirable properties, e.g., good film strength, insolubility in cold water, oil, and alcohol, solubility in hot water, pressure sealability, film clarity, film flexibility, edibility, inertness to drugs or other materials to be encapsulated, and rapid setting from solution to form a gel. In the manufacture of photographic elements the gelatin must possess the necessary qualities of clarity, strength, setting power, and flexibility.

Although gelatin is useful for its rapid gelling ability, excellent film forming properties, and ability to impart oxygen impermeability, it has the disadvantages of high cost, limited availability, and, at times batch property variations. Because of these shortcomings, those industries where the need for gelatin is greatest have long sought a means of extending or replacing gelatin.

The replacement of all the gelatin by certain synthetic polymers results in the loss of the outstanding film forming, stability, and swelling properties of the original gelatin. The replacement of part of the gelatin is also impractical, since the use of compounds such as polyvinylpyrrolidone, polyvinyl alcohol, cellulose acetate, and native starches has generally resulted in an appreciable impairment of these properties. Such disadvantages prevent the production of firm, non-tacky, and non-brittle films which may be sealed by conventional techniques.

A useful gelatin extender must be compatible with gelatin and stable in mixtures with gelatin, and must not impair the properties of the gelatin which are required in a particular use, e.g., film or binding strength in the pharmaceutical industry or phototransmissibility and resistance to abrasion in the photographic industry and binding strength in the adhesive industry.

SUMMARY OF THE INVENTION

It is the prime object of this invention to provide an economical means for extending aqueous, gelatin composition utilized in industrial application. It is a further object of this invention to provide gelatin materials extended with starch derivatives so as to yield smooth, non-grainy dispersions.

Various other objects and advantages of this invention will become apparent from the following description.

We have found that particular modified starches, when incorporated with gelatin in aqueous solutions, display compatibility superior to those of their parent starch bases. More precisely, we have found that those fluidity starches and thermally modified starches which have been chemically modified with monoreactive moieties to a degree of substitution of at least 0.008 and exhibit gelatin compatibility and dispersion stability as determined by the following compatibility test, are useful gelatin extenders.

To evaluate any particular modified starch for its utility in the preparation of the novel, extended gelatin compositions, the cooked starch is mixed with the hydrated gelatin at ratios ranging from about 3 to 60 percent of starch and about 97 to 40 percent of gelatin, by weight, based on the total solids, and the solution is held at about 137°F. (58°C.) for at least 16 hours. The gelatin component is prepared by suspending the desired amount in cold water and then heating the suspension at about 140°F. (60°C) under moderate stirring until completely dispersed. The starch component is prepared by cooking a slurry of the desired amount of the starch at between 200° and 212°F. (99°–100°C.) for about 20 minutes and then cooling the cook to about 140°F. (60°C) prior to admixing with gelatin. In any instance the quantities of the starch and the gelatin are in reciprocal amounts such that the total solids is 30 percent, by weight, of the final solution. Following the holding period compatibility and stability are evaluated based on a visual examination of the solution. Only those starch-gelatin mixtures which yield a test solution free from any phase separation or sediment are useful as extended gelatin compositions according to this invention.

Gelatin compositions extended with modified starches in the proportions within the limits which fulfill the conditions of the above test are found to have film forming and colloidal properties comparable to those of gelatin alone.

DESCRIPTION OF PREFERRED EMBODIMENTS

According to our invention, the useful modified starches may be the starch products derived by chemical means from any plant source including corn, waxy maize, potato, sweet potato, wheat, rice, sago, tapioca, sorghum, high amylose corn, and the like which possess the necessary properties based on the evaluation procedure discussed above. Also included among the modified starches suitable for use in the practice of this invention are the thermally converted, fluidity or thin boiling type products derived from the aforementioned type chemically modified starches. Such materials may be of the lower molecular weight type prepared by heating the modified starch alone or by subjecting the said starch to a combined hydrolytic acid and heat treatment or by any other known method designed for the thermal conversion of the starch such as enzymic heat treatment.

Since the usefulness of any modified starch, as a gelatin extender, is a function of the inter alia Degree of Substitution (D.S.), i.e., the number of substituent groups per anhydroglucose unit, it is necessary that the number of such groups be sufficient to produce adequate compatibility and dispersion stability of the extended gelatin composition. Accordingly, it is preferred that in practice of this invention, the starch have a D.S. of at least 0.008.

The particular type starch chosen will depend on its usefulness, availability, and cost. Among the useful modified starches are the succinates, alkenyl succinates, diethylaminoethyl ethers, phthalates, sulfonates, carboxymethylated and chlorinated derivatives of native starches or thermally converted native starches. Preferred modified starches are the alkenyl succinates, and succinates of waxy maize starch.

The preparation of the modified starches may be carried out by any conventional method whereby the hydroxyl groups of the anhydroglucose unit of the starch base are partially modified by the substituent groups. Typical methods for the preparation of starch derivatives useful herein are discussed by H. J. Roberts in Starch: Chemistry and Technology, Vols. I and II, Academic Press, New York, 1965 and 1967, respectively; various other methods would include those taught in assignee's U.S. Pat. Nos. 2,461,139, 2,661,349, 2,802,000, 2,813,093, and 2,825,727, all of which are fully incorporated herein.

With regard to proportions, the concentration of the starch may range from about 3 to 60 percent, preferably 15 to 40, based on the total weight of the solids.

For example it is preferred that a thermally converted n-octenyl succinate of waxy maize or a thin boiling succinate of waxy maize be used as an extender in amounts ranging from 15 to 40 percent, by weight, of the gelatin and starch.

The extended gelatin compositions of this invention are prepared by mixing the gelatin and modified starch extender in aqueous solution containing from 1 to 45 percent total solids, then drying the composition after it is put into a desirable form such as a film or capsule, to a moisture content of no more than 25 percent, by weight.

The films obtained from the novel extended compositions according to this invention may be made by any conventional method designed to deposit a continuous coating or layer of the solution onto a substrate or mold of any form. Among the various techniques of coating are included spraying, dipping, air knife, trailing blade, reverse and direct roll coaters, etc. A film such as an overcoating or capsule shell may then be formed by drying the coated solution to a desired moisture content, using any means suitable for the particular purpose. Suitable conventional means are air, warm or cold air impingement, low humidity chamber or oven drying, etc. For example, in the pharmaceutical industry, the hard shell capsules are prepared by automatically dipping metal tynes or mold pins into the heated solution (about 137°F. or 58°C.) and moving the coated tynes through a series of drying kilns which are set to precisely control dehydration. Prior to drying the coated tynes may be subjected to a blast of cold air to facilitate gelling.

The soft shell capsules are prepared by casting a film of the gelatin solution and then continuously passing two ribbons of the said film between two opposing rollers, each of which is equipped with an internal vacuum that draws in the film through half capsule wells engraved in its surface. The capsule contents are deposited between the shell halves as they are formed and sealed. The process is continuous, ending with the filled capsule being automatically conveyed to and through a wash unit and a drying unit which partially dries the capsule. Drying is completed in warm air tunnels.

In the following examples the film samples were prepared by casting a layer of the test solution at about 140°F. (60°C.) onto a 6 × 15 inch (9 × 30 cm) chrome plate by means of a Bird Applicator and drying at 75°F. (24°C.) and 55 percent relative humidity.

Film appearance was evaluated on the basis of visual observation. The film forming ability of the test solution and the quality of the film thus formed were evaluated on the basis of the following tests:

Moisture Content: The moisture content of film samples was determined using a Cenco Moisture Balance (Model No. 26675).

Tensile Strength (T.S.): The tensile strength of film strips 1.0 × 0.5 inches (2.5 × 1.25 cm) was determined with an Instron Strength Testing Machine (model No. T.T.C.).

Flexibility: To determine the flexibility ⅝ × 6 inch (1.5 × 9 cm) strips were tested by repeated folding until failure on a Folding Endurance Tester (Tinius Olsen). Results were calculated as follows:

Flexibility = (Nos. of flexes to breaking/Avg. film thickness (mils)*

* 1 mil = 0.001 inch = 0.0025 cm

The invention will be further illustrated by, but is not intended to be limited to, the following examples. In all examples, the amounts of starch are given as percent, by weight, of the total solids.

EXAMPLE I

This example illustrates the use of a chemically and thermally modified starch for the preparation of a novel composition of this invention.

In this instance a thermally modified n-octenyl succinate derivative of below. maize was employed. The modified starch was prepared according to the method taught in U.S. Pat. No. 2,661,349 and had a D.S. of 0.04 which is fully incorporated herein. The test composition comprising 30 percent, by weight, total solids of which 15 percent of the solids was the starch extender prepared as follows:

A. There was introduced into a vessel equipped with a mechanical means of agitation and containing 45.0 milliliters of water 25.5 grams of gelatin. The suspension was then heated to and maintained at about 140°F. (60°C.) for 1 hour under moderate stirring to ensure homogeneity.

B. In a separate container equipped with a mechanical means of agitation and having 25.5 milliliters of water there was suspended 4.5 grams of the thermally converted n-octenyl succinate modified waxy maize. This slurry was cooked at about 200°F. (95°C.) for 10 minutes, cooled to about 140°F. (60°C.) for 16 hours along with a control having 30 percent, by weight, of gelatin. Upon completion of the holding period, the solutions were compared.

It was observed that in the starch extended sample there was a very slight cloudiness. However, this solution, like the control, was smooth and remained homogeneous. It showed no phase separation or sediment. Film samples were obtained from these solutions and tested in the manner described above.

Results of the film tests are presented in Table 1 below

TABLE 1

| Film Sample | Appearance | Moisture Content (per cent) | Strength (psi) | Flexibility |
|---|---|---|---|---|
| Test | very slight haze | 15.5 | 13,300 | 12.7 |
| Control | clear | 16.0 | 13,000 | 21.0 |

As indicated in the above summarized data, a thermally converted, chemically modified starch is quite useful in the practice of this invention. The starch extender did not impair the gelling and film forming abilities of the gelatin. And the film thus formed was free of any perceptible defects in clarity and displayed excellent dimensional characteristics.

EXAMPLE II

This example illustrates the use of chemically modified fludity starch in the preparation of an extended gelatin composition of this invention.

The procedural steps of Parts A and B in Example I were repeated, except in this instance a thin boiling succinate of waxy maize was used in A instead of the thermally converted n-octenyl succinate derivative. The starch herein comprised a low viscosity product obtained by treating a thin boiling waxy maize base (fluidity) 85) with succinic anhydride according to the method taught in Example 8 of U.S. Pat. No. 2,461,139; said waxy maize base having been previously acid converted. Following the 16-hour storage period the test composition and films obtained therefrom were evaluated, along with the respective controls, in the manner set forth in Example I.

The appearance of the sample solution was identical to that of the control. Both solutions showed a very slight yellow tint and were devoid of any separation of settling. The films obtained from the extended gelatin were comparable in appearance and properties to the control films of gelatin.

EXAMPLE III–IV

These examples illustrate the use of additional modified starches in the preparation of the extended compositions of this invention.

In the preparation of each of four samples the procedure of Example I was repeated, except in each instance a particular modified starch was substituted for the thermally modified n-octenyl succinate derivative of waxy maize. The particular starches used herein are identified as follows:

III — A starch ester prepared by treating waxy maize with phthalic anhydride according to the method taught in Example 7 of U.S. Pat. No. 2,461,139. This starch product has a D.S. of 0.02.

IV — A starch ether prepared by (a) reacting waxy maize with sodium chloroacetate in an aqueous-alkaline medium for 16 hours at 40°C., (b) neutralizing the product, (c) dialyzing said product free of salts, and (d) freeze drying the product. This product had a D.S. of 0.2.

V — A starch ether prepared by treating a corn starch hybrid (55 per cent amylose) with beta-diethylaminoethyl chloride hydrochloride according to the method taught in Example 1 of U.S. Pat. No. 2,813,093. This starch product had a D.S. of 0.5.

VI — oxidized starch prepared by treating waxy maize with sodium hypochlorite solution according to the method taught in U.S. Pat. No. 2,317,752, which is fully incorporated herein. This starch product had a D.S. of 0.05.

The solutions and films obtained therefrom were comparable to those of the respective controls and the products of Example I.

EXAMPLE VII

This example illustrates the usefulness of a chemically modified and thermally converted starch at varied concentrations in the preparation of the extended gelatin compositions in accordance with this invention.

Using a sufficient quantity of a modified starch identical to that employed in Example I, the procedures of that same example were repeated in the preparation of a series of sample compositions, A–G, having varied amounts of starch and gelatin. All samples contained 30 percent, by weight, total solids of which the component ratios were regulated between 0 and 50 percent. The resultant solutions and the films obtained therefrom were evaluated and tested, along with gelatin controls, according to the methods set forth in Example I. Comparative results are presented in Table 2 below.

TABLE 2

| Sample | Gelatin Starch Ratio | Viscosity 137°F.(39°C)(cps) | Moisture Content (per cent) | Strength (psi) | Flexibility |
|---|---|---|---|---|---|
| Control | 100:0 | 1025 | 16.0 | 13,800 | 21.0 |
| A | 90:10 | 950 | 15.2 | 13,000 | 5.6 |
| B | 85:15 | 885 | 15.7 | 13,300 | 12.7 |
| C | 80:20 | 805 | 16.8 | 13,800 | 12.2 |
| D | 75:25 | 775 | 13.6 | 12,900 | 11.7 |
| E | 70:30 | 700 | 13.6 | 11,700 | 6.3 |
| F | 60:40 | 650 | 14.4 | 9,500 | 3.6 |
| G | 50:50 | 550 | 14.0 | 3,200 | 0.0 |

As indicated by the data summarized above, a modified starch may be used at varied amounts to extend gelatin in accordance with this invention. The thermally converted chemically modified starch used herein remained compatible and stable throughout the entire range.

EXAMPLE VIII

This example illustrates the usefulness of a modified starch-extended gelatin composition typical of this invention in the preparation of gelatin capsules.

Using a gelatin having a gel strength above 230 (based on standard gelometer determination) and an octenyl succinate derivative of waxy maize, the procedural steps of Example I were repeated. The modified starch extended gelatin composition was then used to prepare hard shell capsules as follows:

The capsules were prepared by dipping lubricated tynes into the modified starch extended gelatin composition, withdrawing and placing the solution coated tynes in a forced air oven set at about 87°F. (31°C.) until dry. The capsule halves were removed from the tynes and trimmed.

When compared with a control capsule obtained from a gelatin solution, the sample capsules were similar in appearance and flexibility.

An advantage of our invention is that it provides a simple, dependable, and efficient means for extending the gelatin used in gelatin compositions.

Another advantage of our invention is that the preparation of the present, novel compositions merely involves the admixing of the modified starch with the hydrated gelatin. No special technique is required. The operation can be carried out by ordinary means with conventional apparatus. The resulting starch extended compositions can be utilized in any commercial process requiring gelatin and to which conventional coating and drying methods are adaptable.

Though the invention is particularly efficacious in the pharmaceutical and photographic products which call for film forming materials, it is not limited thereto. The characteristics exhibited by the present, novel extenders, particularly their ready compatibility with the gelatin, permit them to be used in a wide range of applications. A wide variety of optional ingredients may be incorporated into the gelatin compositions of this invention either prior to or after admixing the starch extender. Among the prominent additives which may be utilized are included plasticizers, preservatives, colorants, flavoring agents, hardeners, antifoggers, sensitizers, and spreading agents. It should be noted that the inclusion of such additives has no adverse effect upon the properties exhibited by our novel extended, gelatin compositions.

Summarizing, it is thus seen that this invention provides a novel, efficient means for extending gelatin.

It is to be noted, that although the emphasis has been placed on describing this invention in connection with film forming gelatin compositions, the various chemically and chemically, thermally modified starches may accordingly be utilized as extenders in gelatin compositions such as creams, emulsions, binders, adhesives, etc. Variations in materials, proportions, and procedures may be made without departing from the scope and spirit of this invention as defined by the following claims.

What is claimed is:

1. An extended gelatin composition comprising 40 to 97 percent of gelatin and 3 to 60 percent, by weight, of a modified starch selected from the group consisting of:
    a. fluidity starches chemically modified with monoreactive moieties having a degree of substitution at least 0.008, and
    b. thermally modified starches chemically modified with monoreactive moieties to a degree of substitution of at least 0.008;

said modified starches selected from the group consisting of the succinates, alkenyl succinates, diethylaminoethyl ethers, phthalates, sulfonates, carboxymethylated and chlorinated derivatives, and being chosen so that an aqueous solution containing 30 percent, by weight, total solids comprising the chosen proportions of said modified starch and gelatin, held at a temperature of 137°F. (58°C.) for 16 hours exhibits no phase separation.

2. The extended gelatin composition of claim 1, wherein said modified starch is a thermally converted n-octenyl succinate derivative of waxy maize.

3. The extended gelatin composition of claim 1, wherein said modified starch is a succinic anhydride treated thin boiling waxy maize.

4. A pharmaceutical capsule shell having a wall consisting essentially of an extended gelatin composition comprising an equilibrium amount but no more than 25 percent, by weight, of water, the remainder of said composition comprising 40 to 97 percent, by weight, of gelatin, and 3 to 60 percent, by weight, of a modified starch selected from the group consisting of:
    a. fluidity starches chemically modified with monoreactive moieties having a degree of substitution of at least 0.008, and
    b. thermally modified starches chemically modified with monoreactive moieties to a degree of substitution of at least 0.008;

said modified starches selected from the group consisting of the succinates, alkenyl succinates, diethylaminoethyl ethers, phthalates, sulfonates, carboxymethylated and chlorinated derivatives, and being chosen so that an aqueous solution containing 30 percent, by weight, total solids comprising the chosen proportions of said modified starch and gelatin, held at a temperature of 137°F. (58°C.) for 16 hours exhibits no phase separation.

* * * * *